United States Patent
Ichikawa et al.

(10) Patent No.: US 6,593,727 B1
(45) Date of Patent: Jul. 15, 2003

(54) DATA PROCESSOR AND DATA PROCESSING METHOD FOR WAVEMETER

(75) Inventors: Akio Ichikawa, Kawagawa (JP); Kenji Mogi, Osaka (JP)

(73) Assignees: Ando Electric Co. Ltd., Kawasaki (JP); Loarant Co., Osaka (JP)

(*) Notice: Subject to any disclaimer, the term of this patent is extended or adjusted under 35 U.S.C. 154(b) by 9 days.

(21) Appl. No.: 09/671,134

(22) Filed: Sep. 27, 2000

(30) Foreign Application Priority Data

Sep. 30, 1999 (JP) .......................................... 11-280512

(51) Int. Cl.[7] .............................................. G01R 23/16
(52) U.S. Cl. ................. 324/76.36; 324/76.38; 250/341.6
(58) Field of Search ..................... 250/341.6, 339.07, 250/339.08, 458.1; 324/76.36, 76.38, 76.21, 76.24

(56) References Cited

U.S. PATENT DOCUMENTS 5,251,008 A * 10/1993 Masutani ............... 250/339.08
6,288,529 B1 * 9/2001 Takeuchi et al. ......... 324/76.22

* cited by examiner

*Primary Examiner*—N. Le
*Assistant Examiner*—Vincent Q. Nguyen
(74) *Attorney, Agent, or Firm*—Fish & Richardson P.C.

(57) ABSTRACT

The CPU outputs to the delay circuit 22 delay time setting signals for setting the delay time, based on input delay time data input from an external input device. The delay circuit 22 re-sets the delay time via new delay setting signals input from the CPU 24 and delays the trigger signals input from the trigger circuit 21 based on the specified delay time and outputs the resulting signals to the clock generator 23. The clock generator 23 outputs new sample start signals to the A/D sampler 3 at the input timing of the delayed trigger signals input from the delay circuit 22, thus changing the sampling start timing of interference signals in the A/D sampler.

2 Claims, 2 Drawing Sheets

DATA PROCESSOR AND DATA PROCESSING METHOD FOR WAVEMETER

BACKGROUND OF THE INVENTION

1. Field of the Invention

The present invention relates to a data processor for a wavemeter which executes data processing to display optical frequencies/wavelengths of optical signals measured by the wavemeter and to a data processing method for the wavemeter.

2. Description of the Related Art

In recent years, a sudden increase in data communication demands has requested higher-capacity optical communications. In order to meet this request, the Wavelength Division Multiplexing (WDM) transmission technology has come into service and has been upgraded actively. Higher-performance wavemeters are in need in order to evaluate transmission systems and optical devices utilizing the WDM transmission technology.

In a conventional wavemeter used for evaluating transmission systems and optical devices utilizing the WDM transmission technology, a series of processing described below used to be repeated sequentially: digital interference signal data obtained via A/D sampling of interference signals input from an interferometer is temporarily stored in buffer; the digital interference data stored in the buffer is read by the Digital Signal Processor (DSP) to convert the data to frequency data; and the frequency data is further converted to optical frequency data or optical wavelength data.

Conventional wavemeters use, for example, a clock generator 31 and a trigger circuit 32 shown in FIG. 3 as an external circuit for setting the sampling start timing for an A/D sampler. In the circuit configuration shown in FIG. 3, the clock generator 31 outputs sample start signals to the A/D sampler depending on trigger signals output from the trigger circuit 32.

In the circuit configuration shown in FIG. 3, the timing at which sample start signals are output is constant and in the A/D sampler, the fixed timing for starting sampling of interference signals is set via the input timing of the sample start signals.

However, in a conventional wavemeter used for evaluating transmission systems and optical devices utilizing the WDM transmission technology, sampling start signals output from the circuit shown in FIG. 3 were used to set the fixed timing for starting sampling of interference signals, thus presenting the following problems.

For example, in case that the rise timing of effective signal components contained in interference signals has changed due to individual difference or secular change of the A/D sampler, or optical signals to be measured, necessary adjustment of the sampling start timing is impossible via the circuit configuration in FIG. 3. This has degraded operability and reliability of the wavemeter.

SUMMARY OF THE INVENTION

An object of the invention is to provide a data processor for a wavemeter equipped with an adjustment mechanism for enabling arbitrary adjustment of the sampling start timing for an A/D sampler depending on the individual difference or secular change of the A/D sampler, or optical signals to be measured, and a data processing method for the wavemeter.

According to an aspect of the invention, there is provided a data processor for a wavemeter which processes interference signals of the optical signals in order to display optical frequencies/wavelengths of optical signals measured by the wavemeter, characterized in that the data processor comprises:

data conversion means for sampling and converting the interference signals to digital interference signal data (for example, an A/D sampler 3 in FIG. 1), start timing setting means for setting the sampling start timing for the data conversion means (for example, a trigger circuit 21 and a clock generator 23 in FIG. 2), and start timing adjusting means for arbitrarily adjusting the sampling start timing set via the start timing adjusting means (for example, a delay circuit 22 in FIG. 2).

According to the aspect of the invention, in a data processor for a wavemeter which executes data processing to display optical frequencies/wavelengths of optical signals measured by the wavemeter, the data conversion means samples and converts the interference signals to digital interference signal data, the start timing setting means sets the sampling start timing for the data conversion means, and the start timing adjusting means arbitrarily adjusts the sampling start timing set via the start timing setting means.

According to another aspect of the invention is a data processing method for a wavemeter which processes interference signals of the optical signals in order to display optical frequencies/wavelengths of optical signals measured by the wavemeter, characterized in that the data processing method comprises:

a data conversion step for sampling and converting the interference signals to digital interference signal data, a start timing setting step for setting the sampling start timing for the data conversion step, and a start timing step for arbitrarily adjusting the sampling start timing set via the start timing step.

According to the another aspect of the invention, a data processing method for a wavemeter which executes data processing to display optical frequencies/wavelengths of optical signals measured by the wavemeter comprises a data conversion step for sampling and converting the interference signals to digital interference signal data, a start timing setting step for setting the sampling start timing for the data conversion step, and a start timing step for arbitrarily adjusting the sampling start timing set via the start timing step.

Thus, in case that the rise timing of effective signal components contained in interference signals has changed depending on optical signals to be measured, adjustment of the sampling start timing can be made with ease, thus improving operability and reliability of the wavemeter.

In this case, according to the invention, a data processor for a wavemeter according to the first aspect of the invention can be such that the start timing adjusting means comprises adjustment processing means (for example, CPU 24 of FIG. 2) for executing adjustment processing to adjust the sampling start timing set via the start timing means, based on timing adjustment data input from input means.

According to the invention, the start timing adjusting means executes adjustment processing to adjust the sampling start timing set via the start timing means, based on timing adjustment data input from the input means.

In this case, same as the fourth aspect of the invention, a data processing method for a wavemeter according to the third aspect of the invention can be such that the start timing adjusting step comprises an adjustment processing step for executing processing to adjust the sampling start timing set via the start timing step, based on timing adjustment data input from input means.

According to the invention, the start timing adjusting step comprises an adjustment processing step to adjust the sampling start timing set via the start timing step, based on timing adjustment data input from the input means.

Thus, requirements for setting the sampling start timing can be changed with ease by changing adjustment processing and the sampling start timing adjustment feature can be changed with ease depending on optical signals to be measured.

DETAILED DESCRIPTION OF THE PRESENT INVENTION

Embodiments of the invention are detailed below with reference to drawings.

Figure 1:
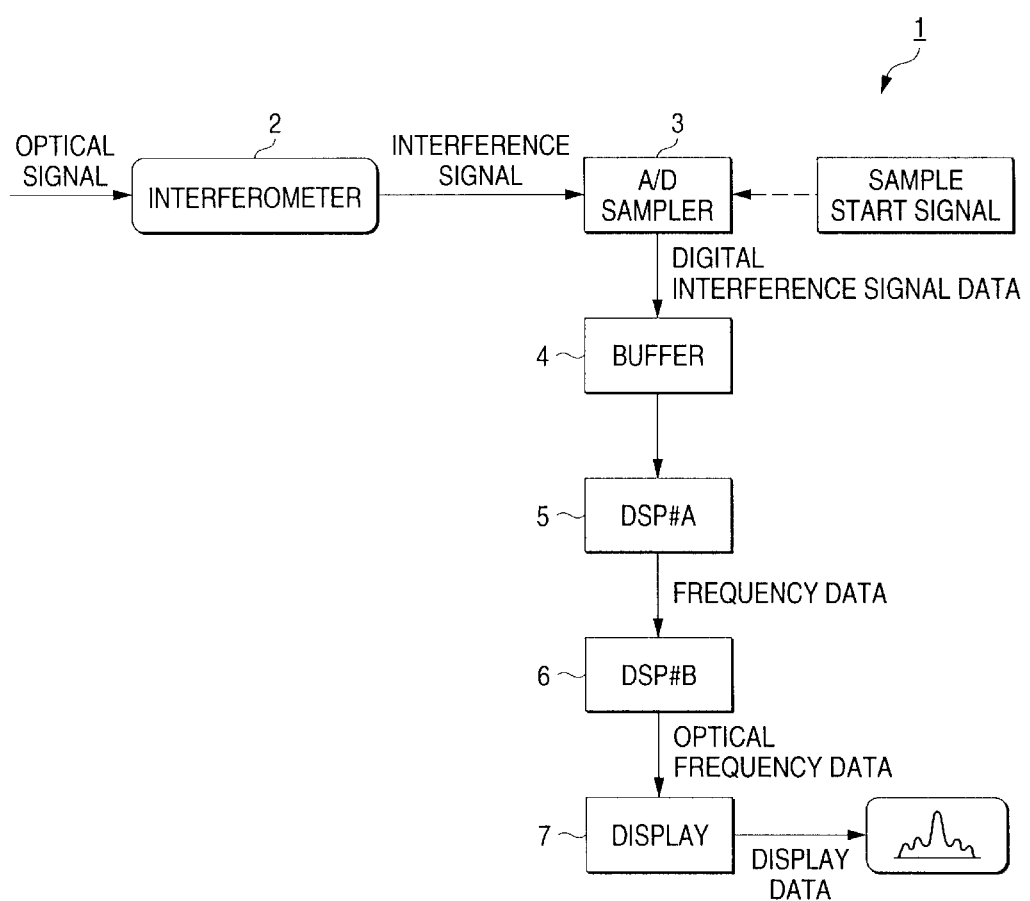
FIG. 1 is a block diagram showing the key configuration of a wavemeter 1 according to an embodiment of the invention.
Figure 2:
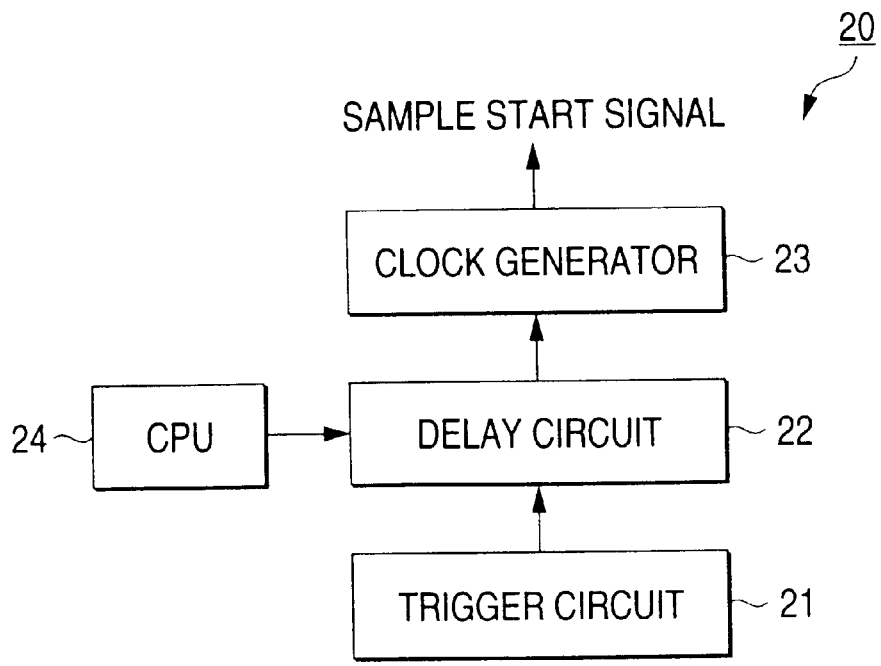
FIG. 2 is a diagram showing the circuit configuration of an external circuit for outputting sample start signals to an A/D sampler in FIG. 1.
Figure 3:
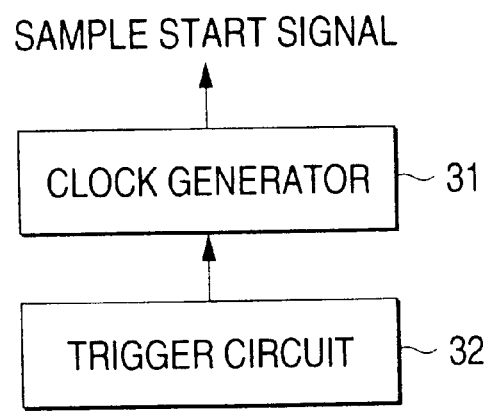
FIG. 3 is a diagram showing the circuit configuration of an external circuit for outputting sample start signals for A/D sampling.

FIG. 1 and FIG. 2 show embodiments of a wavemeter according to the invention. First, the configuration of each embodiment will be discussed.

FIG. 1 is a block diagram showing the general configuration of a wavemeter 1 according to the embodiment. In FIG. 1, the wavemeter 1 is composed of an interferometer 2, an A/D sampler 3, a buffer 4, a DSP#A 5, a DSP#B 6, and a display 7.

The interferometer 2 generates interference signals from measured optical signals coming from transmission systems and optical devices using the WDM transmission technology to be measured, and inputs the resulting interference signals to the A/D sampler 3.

The A/D sampler 3, triggered by sample start signals input from the external circuit in FIG. 2, starts sampling the interference signals input from the interferometer 2, samples the interference signals at a preset sampling timing, performs A/D conversion on the sampled data by using predetermined number of quantizing bits to produce digital interference signal data, and specifies a write address in the buffer 4 for storing the digital interference signal data.

The buffer 4 has a memory area for storing digital interference signal data. In the buffer 4, digital interference signal data is stored at a specified write address, and digital interference signal data is read from a read address specified by a DSP#A 5.

The DSP#A 5 specifies a read address for reading digital interference signal data stored in the buffer 4 to read the data, executes the FFT processing for converting the read digital interference signal data to frequency data, then outputs the resulting frequency data to a DSP#B 6.

The DSP#B 6 executes the data conversion processing in which frequency data input from the DSP#A 5 is converted to optical frequency data or optical wavelength data, and outputs the resulting optical frequency data or optical wavelength data to the display 7.

The display 7 converts optical frequency data or optical wavelength data to display data and executes the display processing for displaying optical frequencies or optical wavelengths contained in optical signals input to the interferometer 2.

Next, the circuit configuration of an external circuit for generating sample start signals to be input to the A/D sampler is described with reference to FIG. 2.

The external circuit 20 shown in FIG. 2 is composed of a trigger circuit 21, a delay circuit 22, a clock generator 23, and a Central Processing Unit (CPU) 24.

The trigger circuit 21 outputs trigger signals for setting the output timing of sample start signals. The delay circuit 22 sets the delay time via delay setting signals input from the CPU 24 and delays the trigger signals input from the trigger circuit 21 based on the specified delay time and outputs the resulting signals to the clock generator 23.

The clock generator 23 outputs the sample start signals to the A/D sampler 3 at the input timing of the delayed trigger signals input from the delay circuit 22.

The CPU 24 outputs to the delay circuit 22 delay time setting signals for setting the delay time for the delay circuit 22, based on delay time data input from an external input device (not shown). The delay time setting processing via the CPU 24 is executed by preset software.

Operation of the embodiment is described below.

In the wavemeter 1 in FIG. 1, the interferometer 2 generates interference signals from measured optical signals coming from transmission systems and optical devices using the WDM transmission technology to be measured, and inputs the resulting interference signals to the A/D sampler 3.

The A/D sampler 3, triggered by sample start signals input from an external circuit 20 in FIG. 2, starts sampling the interference signals input from the interferometer 2, samples the interference signals at a preset sampling timing, performs A/D conversion on the sampled data by using predetermined number of quantizing bits to produce digital interference signal data. The A/D sampler 3 specifies a write address in the buffer 4 for storing the digital interference signal data.

The DSP#A 5 specifies a read address for reading digital interference signal data stored in the buffer 4 to read the data, and executes the conversion processing for converting the digital interference signal data to frequency data, then outputs the frequency data to the DSP#B 6.

The DSP#B 6 executes the data conversion processing in which frequency data input from the DSP#A 5 is converted to optical frequency data or optical wavelength data, and outputs the resulting optical frequency data or optical wavelength data to the display 7.

The display 7 converts optical frequency data or optical wavelength data to display data and executes the display processing for displaying optical frequencies contained in optical signals input to the interferometer 2.

In case that service personnel perform adjustment of the sampling start ting for the A/D sampler in FIG. 1, an input device is used to input delay time data to the CPU 24 in the external circuit 20.

The CPU 24 in the external circuit 20 of FIG. 2 outputs to the delay circuit 22 delay time setting signals for setting the delay time, based on input delay time data. The delay circuit 22 re-sets the delay time via new delay setting signals input from the CPU 24 and delays the trigger signals input from the trigger circuit 21 based on the specified delay time and outputs the resulting signals to the clock generator 23.

The clock generator 23 outputs new sample start signals to the A/D sampler 3 at the input timing of the delayed trigger signals input from the delay circuit 22. A change in the delay time causes a change in the input timing of sample start signals input to the A/D sampler, thus resulting in a change in the sampling start timing of interference signals in the A/D sampler.

Thus, in the embodiment, the output timing of sampling start signals to the A/D sampler 3 can be arbitrarily changed via a simple setting operation in the external circuit 20. This has enabled arbitrary adjustment of the sampling start timing for the A/D sampler depending on the individual difference or secular change of the A/D sampler, or optical signals to be measured.

Accordingly, in case that the rise timing of effective signal components contained in interference signals has changed depending on optical signals to be measured, adjustment of the sampling start timing can be made with ease, thus improving operability and reliability of the wavemeter.

In the embodiment, the delay time setting processing is made via preset software. This enables the sampling start timing to be adjusted with ease via software change and the sampling start timing adjustment feature to be changed with ease depending on the specifications of the A/D sampler or optical signals to be measured.

Although the foregoing embodiment of the invention assumes that the output timing of sampling start signals are arbitrarily delayed via software by using the configuration of the delay circuit 22 and the CPU 24 so that the sampling start timing of interference signals in the A/D sampler can be arbitrarily adjusted, setting of the delay time may be adjusted via hardware alone.

According to a data processor of the first aspect of the invention and a data processing method for a wavemeter of the third aspect of the invention, in case that the rise timing of effective signal components contained in interference signals has changed depending on optical signals to be measured, adjustment of the sampling start timing can be made with ease, thus improving operability and reliability of the wavemeter.

According to a data processor of the second aspect of the invention and a data processing method for a wavemeter of the fourth aspect of the invention, requirements for setting the sampling start timing can be changed with ease by changing adjustment processing and the sampling start timing adjustment feature can be changed with ease depending on optical signals to be measured.

What is claimed is:

1. A data processor for a wavemeter processing an interference signal of optical signals to display an optical frequency/wavelength of the optical signals measured by the wavemeter, the data processor comprising:

data conversion means for sampling and converting the interference signal to a digital interference signal data, start timing setting means coupled to the data conversion means to provide a sampling start timing from the start timing setting means to the data conversion means, and start timing adjusting means for arbitrarily adjusting the sampling start timing set by the start timing setting means.

2. The data processor according to claim 1, wherein the start timing adjusting means comprises an adjustment mechanism for executing adjustment processing to adjust the sampling start timing set by the start timing means, based on a timing adjustment data input from input means.

* * * * *